United States Patent [19]

Schlagenhauf

[11] 4,024,592
[45] May 24, 1977

[54] CAMPER-PONTOON BOAT CONSTRUCTION

[75] Inventor: Philip B. Schlagenhauf, Middlebury, Ind.

[73] Assignee: Lan-See, Inc., Berne, Ind.

[22] Filed: Oct. 20, 1975

[21] Appl. No.: 623,585

[52] U.S. Cl. .............................. 9/1.2; 296/23 MC
[51] Int. Cl.[2] ........................................ B63C 13/00
[58] Field of Search .............. 9/1 R, 1 T, 2 R, 2 C, 9/2 F; 114/61; 296/23 B, 23 C, 23 H, 23 F, 23 MC

[56] References Cited

UNITED STATES PATENTS

| | | | |
|---|---|---|---|
| 2,727,484 | 12/1955 | White | 9/1 T |
| 3,079,616 | 3/1963 | Byberg | 9/1 T |
| 3,134,991 | 6/1964 | Levinson | 9/1 T |
| 3,414,916 | 12/1968 | Martin et al. | 9/1 T |
| 3,436,774 | 4/1969 | Schmitz | 9/1 T |
| 3,487,483 | 1/1970 | Freeman | 9/1 R |
| 3,530,519 | 9/1970 | Levinson | 9/1 T |
| 3,662,412 | 5/1972 | Hawkins | 9/1 R |
| 3,673,622 | 7/1972 | Allen | 9/1 T |
| 3,760,764 | 9/1973 | Jones et al. | 9/1 T |
| 3,860,982 | 1/1975 | Rumsey | 9/1 T |

*Primary Examiner*—Trygve M. Blix
*Assistant Examiner*—Jesus D. Sotelo
*Attorney, Agent, or Firm*—Gust, Irish, Jeffers & Rickert

[57] ABSTRACT

A camper-boat construction having a camper body adapted for carriage on a pick-up truck bed, the underside of the body being commensurate dimensionally with the bed. The body has hinged at the edges of its underside elongated panels that have a fold-up or retracted position wherein they may be pivoted flush against the body sides for carriage in the truck and a fold-down or extended position wherein they may be pivoted to and supported at a horizontal position to form a deck area contiguous to the sides and ends of the body. Wheeled struts are adjustably supported to the sides of the body and are lowered during removal of the body from the bed. Pontoons carried on the camper body top are attachable to the underside of the panels in the fold-down position for buoyantly supporting the body.

12 Claims, 13 Drawing Figures

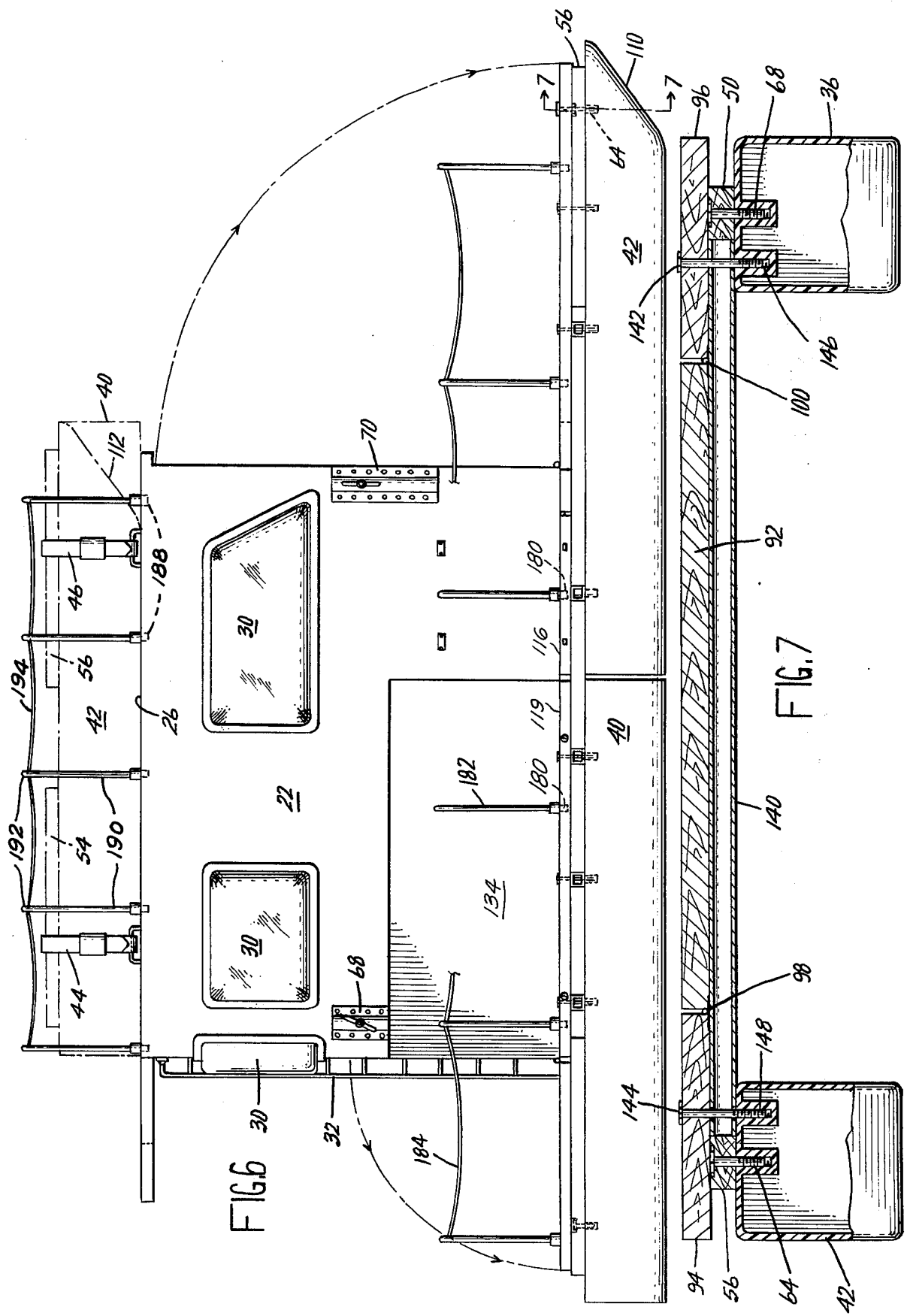

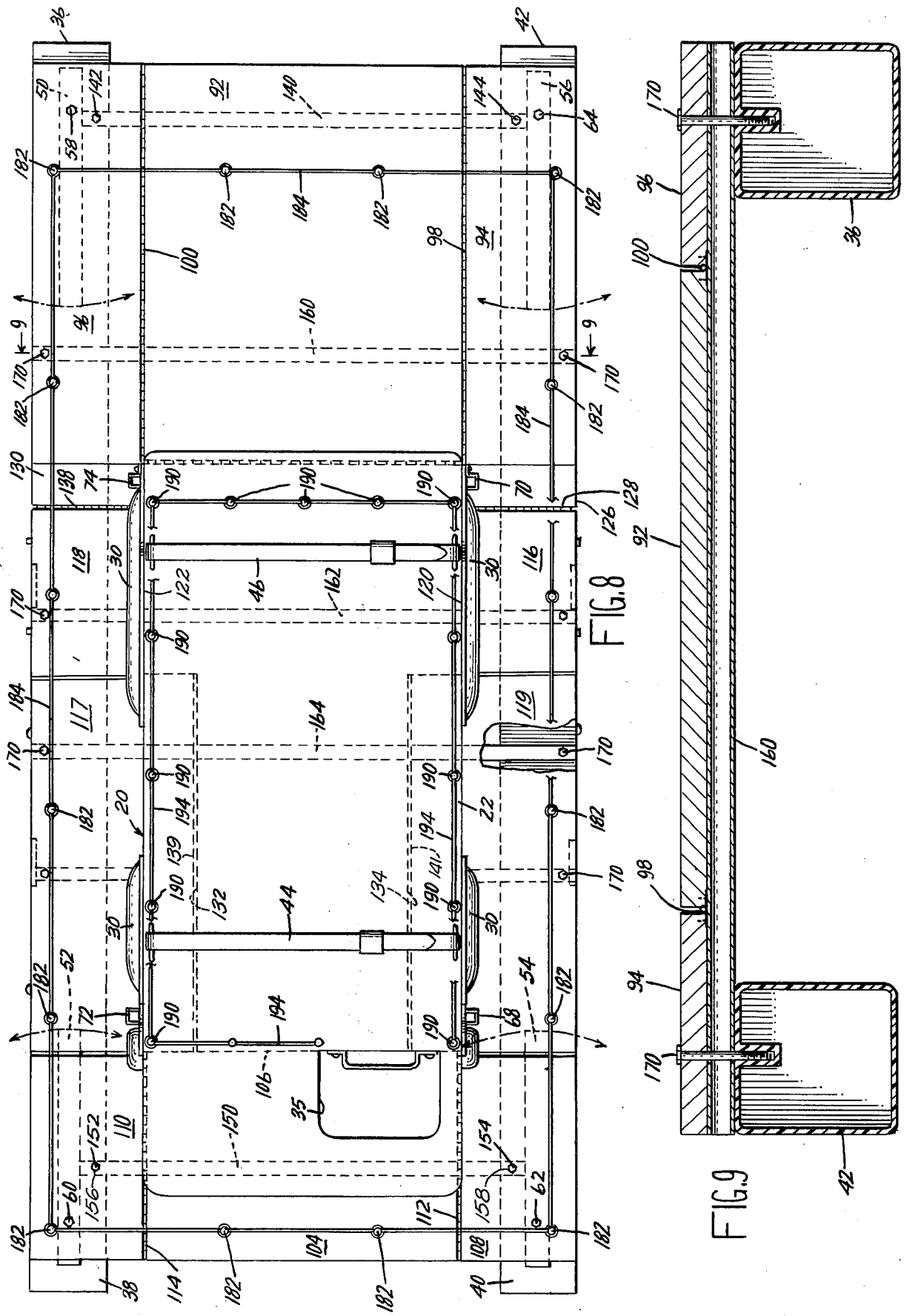

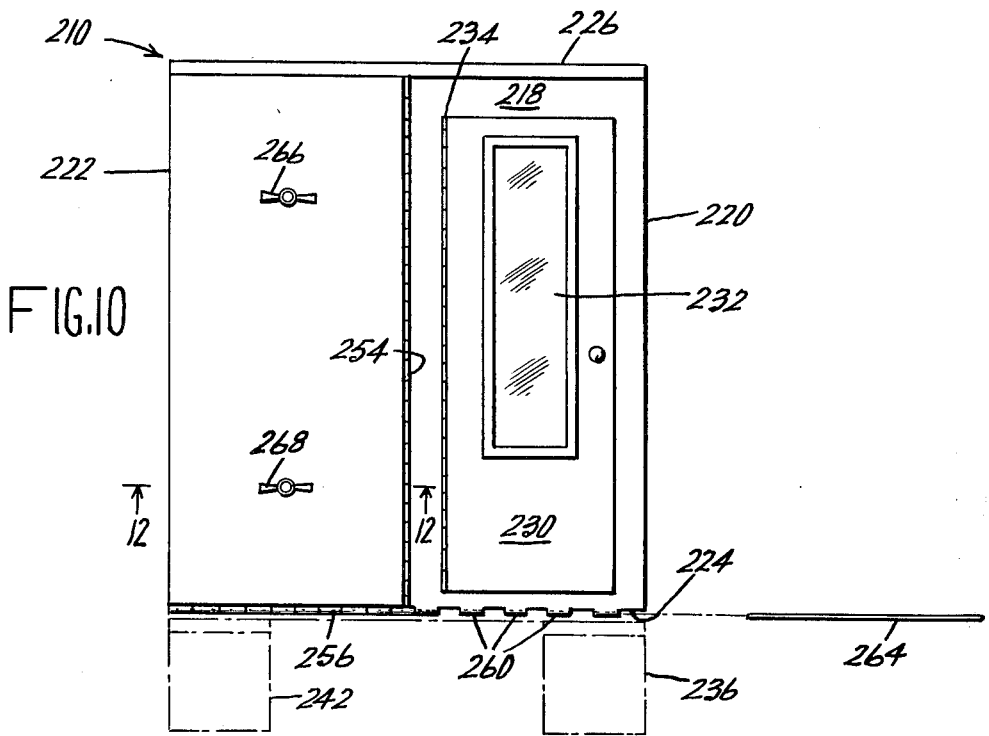
FIG.10
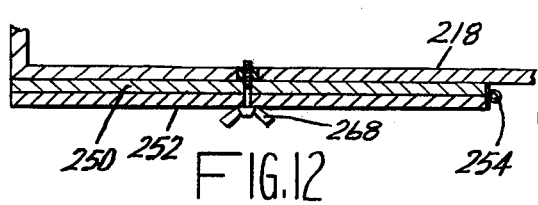
FIG.12
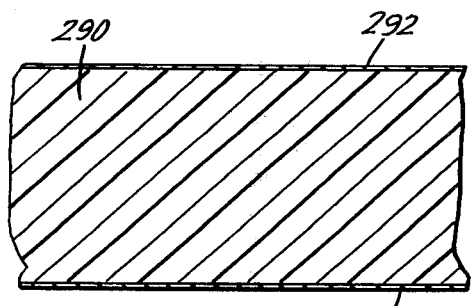
FIG.13
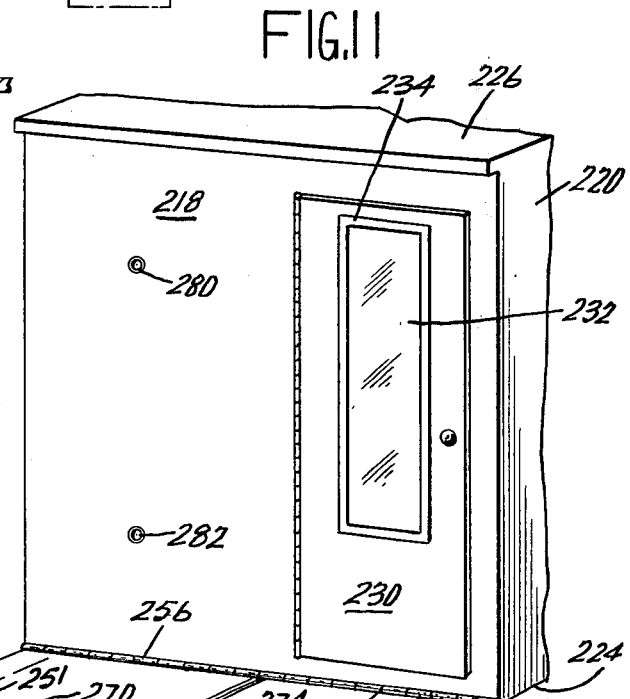
FIG.11
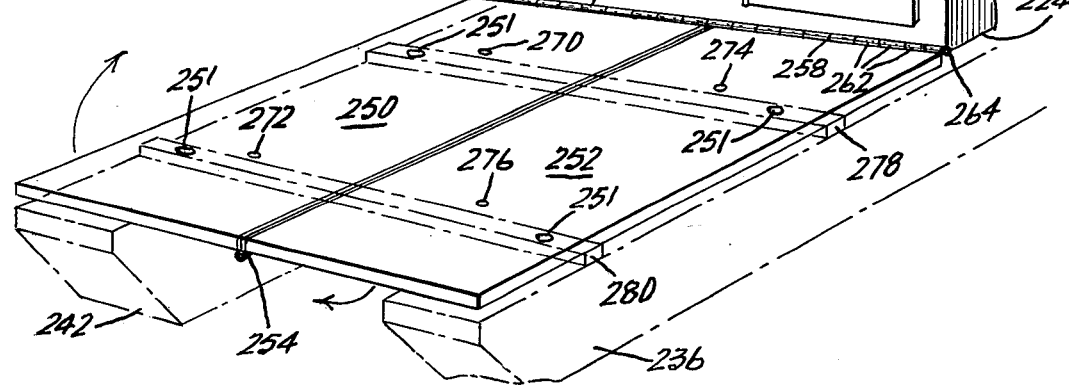

CAMPER-PONTOON BOAT CONSTRUCTION

BACKGROUND OF THE INVENTION

1. Field of the Invention

This invention pertains to camper-boats which are convertible from truck carried campers to boats for aquatic travel.

2. Brief Statement of the Prior Art

Camper-boats are known to the art. In prior constructions, campers have been provided with pontoons pivoted to opposite edges of its underside thereby making the pontoons an integral part of the camper, or elaborate structure is provided for attaching pontoons to the underside of the body. Also, house-boats having fold-down flotation panels are known to the art. However, the art has not provided a camper-boat which has fold-down deck space and pontoons to provide the compact dimensions necessary for carriage by a camper truck that is easily and quickly convertible to a boat having desirable deck space.

SUMMARY OF THE INVENTION

A camper body having front and rear ends connected by spaced, parallel sides is provided with hinged elongated panels at the front, rear and side edges of the body under-side. When the camper-boat is carried by a land vehicle such as a pick-up truck, the panels are folded towards and against the body in a retracted position. When the camper-boat is utilized as an aquatic craft, the panels are unfolded outwardly and downwardly in an extended supported relation to the camper body to form decks extending from and contiguous to the body.

Pontoon sections are carried on the top-side of the camper and are assembled and attached to the underside of the folded-down panels on either side of the body to provide buoyant support for the body. Wheeled carrying struts are supported for vertical adjustment to each corner of the body and are lowered as the body is off-loaded from the truck bed to support the body. Thus, a camper-boat is provided that is of relatively simple and sturdy construction and conversion, provides ample deck space in the aquatic mode, is compact and adaptable for transport by conventional pick-up trucks in the terrestrial mode and is supportable by wheeled struts during off-loading from the truck bed and transport to the water site.

An object of this invention is to provide a camper-boat that is of relatively simple and sturdy construction and is easily convertible between the terrestrial mode and the aquatic mode.

Another object is to provide a camper-boat of the foregoing object that has retractable deck panels that are retracted in the terrestrial mode and extended in the aquatic mode to provide detachable buoyant supports.

A further object is to provide a camper-boat of the foregoing objects which has vertically positionable wheeled struts for aiding in off-loading from the truck bed and transport to the aquatic site.

The above-mentioned and other features and objects of this invention and the manner of attaining them will become more apparent and the invention itself will be best understood by reference to the following description of an embodiment of the invention taken in conjunction with the accompanying drawings.

BRIEF DESCRIPTION OF THE DRAWINGS

FIG. 6 is a side view of the camper-boat in the aquatic mode with the deck panel fully unfolded and pontoons attached to the underside thereof;

FIG. 7 is a section taken at 7—7 of FIG. 6;

FIG. 8 is a top plan view of the camper-boat of FIG. 6;

FIG. 9 is a section taken at 9—9 of FIG. 8;

FIG. 10 is an end view of a second preferred embodiment of this invention showing the pontoons in phantom and hinge pin removed;

FIG. 11 is a partial, perspective view of the embodiment of FIG. 10 with the front deck panels in lowered position, and the pontoons shown in phantom;

FIG. 12 is a partial section taken at 12—12 of FIG. 10; and

FIG. 13 is a partial section of deck panel and camper-boat body wall construction.

DESCRIPTION OF PREFERRED EMBODIMENT

Figure 1:
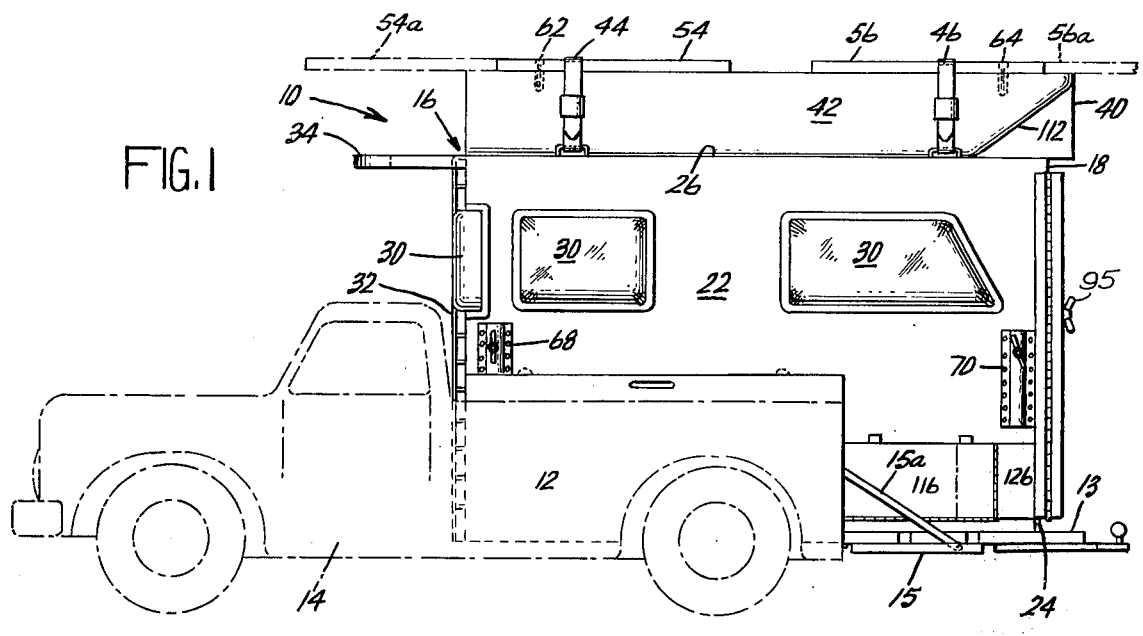
FIG. 1 is a side view of the camper-boat loaded on a pick-up truck shown generally in phantom lines.

Referring to FIGS. 1–4, a camper body 10 is shown in loaded or carried position on a bed 12 of a pick-up truck 14 shown in phantom. Truck 14 has tail gate 15 shown supported by arm 15a in lowered position (FIG.1) to provide additional bed area to support camper body 10. Body 10 is constructed of conventional materials such as wood or reinforced plastic and has a rear wall 16, a front wall 18 and spaced side walls 20 and 22 which are held in assembled relation by construction well known to the art. An underside 24 and a topside 26 are assembled by conventional known methods to complete the camper body construction. Doors and windows 30 are formed in the sides 20 and 22 and front wall 18 again by construction methods known to the art.

Rear wall 16 is provided with a ladder 32 secured thereto and topside 26 has a platform deck 34 extending forwardly of body 10 and is provided with a ladder well 35 to provide access to topside 26 from ladder 32.

Elongate pontoon sections 36, 38, 40 and 42 are fitted side by side on topside 26 of body 10 and are held in place by straps 44, 46 during those periods when the camper boat 10 is carried by truck 14. Elongated arms 50, 52, 54 and 56 (FIGS. 1 and 3) are held in clamped relation to pontoon sections 36, 38, 40 and 42, respectively by threaded bolts 58, 60, 62 and 64 which are threaded respectively into sections 36, 38, 40 and 42. During removal of section 36, 38, 40 and 42 from topside 26, straps 44 and 46 are loosened and removed and bolts 58, 60, 62 and 64 are loosened at which time arms 50, 52, 54 and 56 are swung 180°. The position of two of the arms, 54 and 56, are shown in dash-dot lines 54a and 56a, respectively, after swinging, thereby providing convenient handles and lifting levers for pontoon removal.

Secured to the front and rear of each side 20 and 22 are two elongated vertically aligned strut housings, housings 68 and 70 secured to wall 22 and housing 72, 74 being secured to side wall 20. Each housing 68, 70, 72, and 74 has a vertical passage therein to receive the wheeled struts with struts 76, 78 shown in FIG. 2. Struts 76 and 78 are of an elongated tubular member of square cross section and steel material with a plurality of tapped holes, hole 76a shown for strut 76. Each housing 68, 70, 72, and 74 has an elongated vertically aligned slot, 70a being shown for housing 70 in FIG. 2. A threaded bolt 70b extends through slot 70a and is threaded in one of the tapped holes 76a depending upon the adjustment desired for strut 76 in housing 70. Strut 76 may be lowered by placing bolt 70b in a tapped hole 76a nearer the top of the strut and may be raised by placing bolt 70b in a tapped hole 76a nearer the lower end of strut 76. As will become apparent, securing of the struts to the camper body 10 aids in off-loading of the body from truck 14 and also in transport to the aquatic site. Struts 76, 78 have forks 80 and 82 welded to the lower ends thereof, respectively, which rotatably support wheels 84 and 86, respectively. It will be understood that while only two wheeled struts 76 and 78 are shown, four wheeled struts, one for each housing 68, 70, 72, and 74 may be provided, each of which is identical in construction to strut 76. The struts may be carried separately in the camper body 10 until off-loading from truck 14 takes place.

A stub 88 is attached as by welding to platform 13 connected to bed 12 and tail gate 15 with the stub 88 supporting a ball joint 90 for connection to a trailer hitch or the like.

A three section deck panel having center section 92 and wing sections 94 and 96 connected to the side edges thereof by hinges 98, 100 respectively, is connected by hinge 102 to the forward edge of underside 24. Hinges 98, 100 and 102 are "piano hinges", extend the length of the connection and are well known in the art. Similarly, a center panel 104 (FIG. 8) is connected to the rear edge of underside 24 by hinge 106 and wing sections 108, 110 are connected to the side edges of center panel 104 by hinges 112, 114, respectively.

Figure 2:
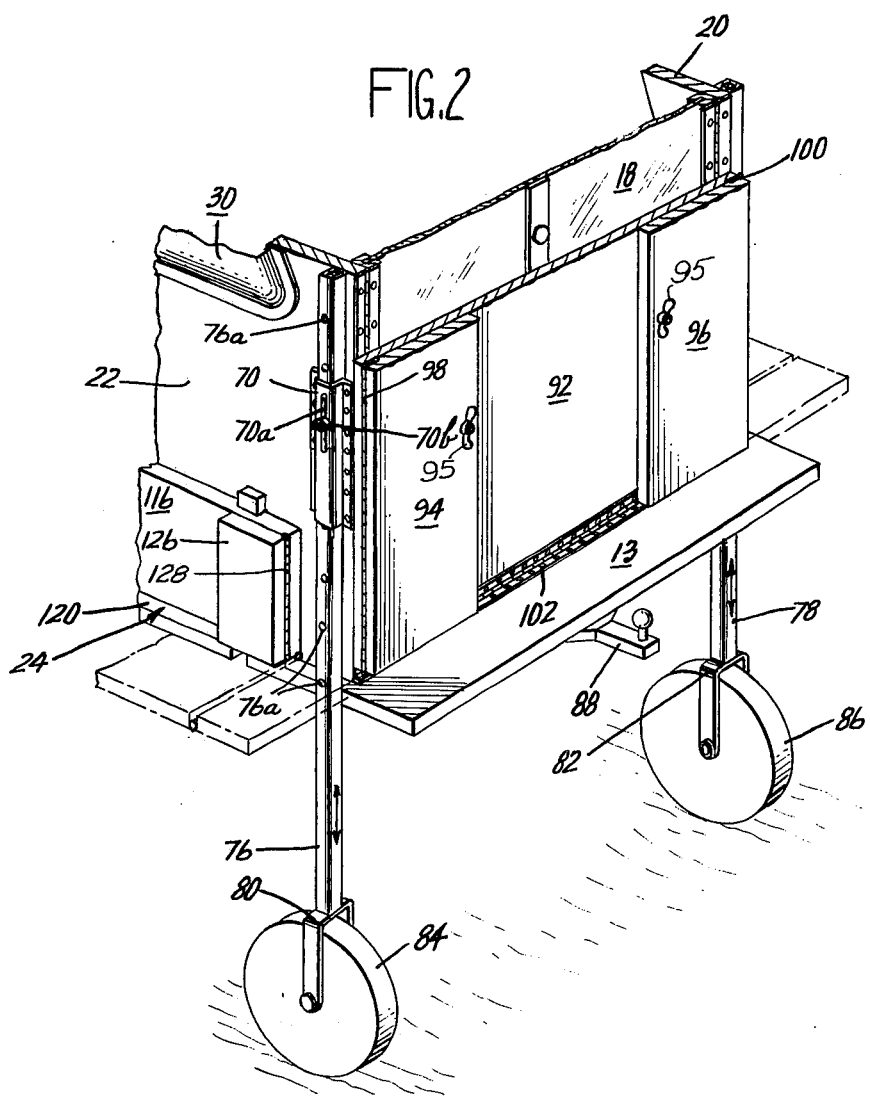
FIG. 2 is a partial view in perspective of a camper body being off-loaded from the truck with the wheeled struts in lowered position.
Figure 3:
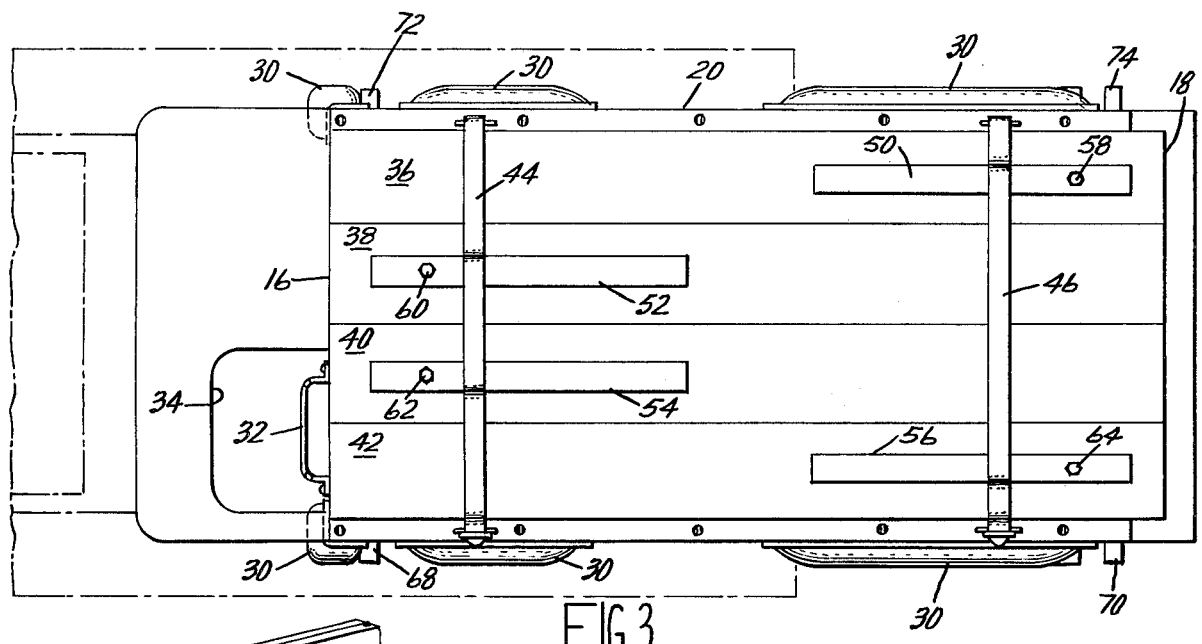
FIG. 3 is a top plan view of the camper body in the partially off-loaded position from the truck.
Figure 4:
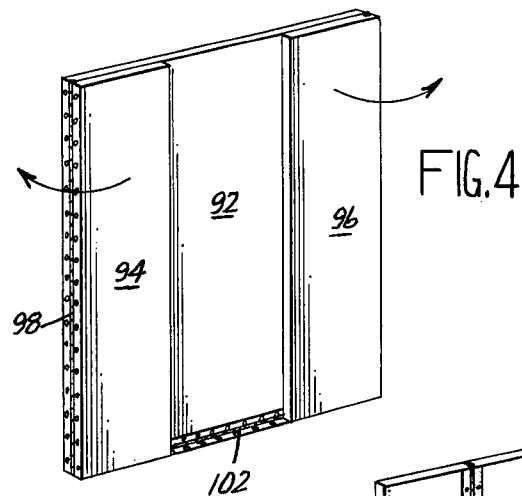
FIG. 4 is a perspective view of the front deck panel in the retracted folded position.
Figure 5:
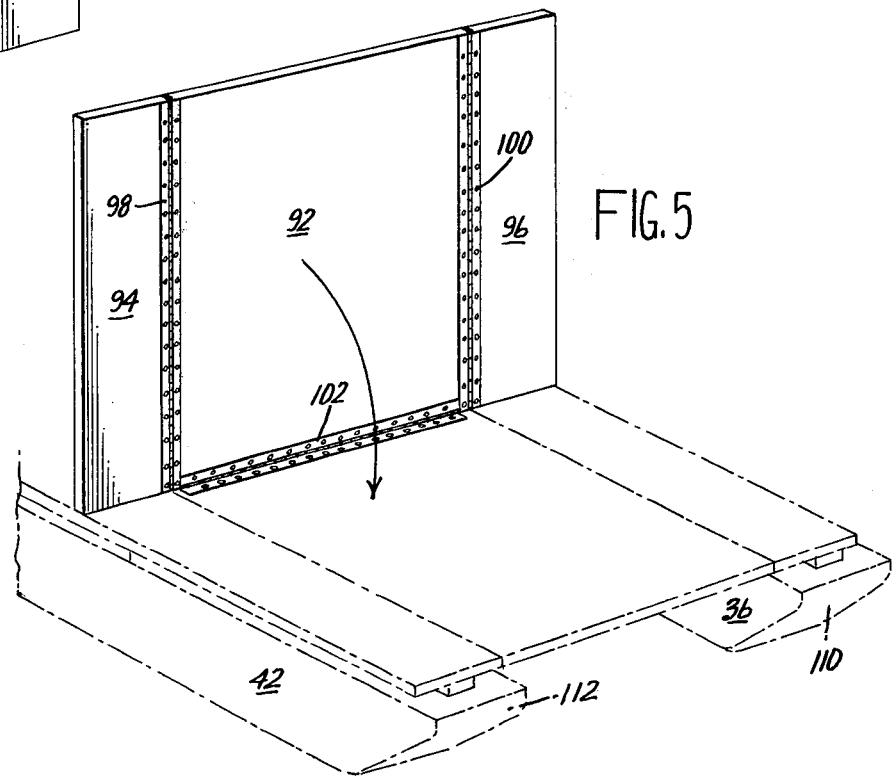
FIG. 5 is a perspective view of the front deck of FIG. 4 in a partially unfolded or open position with a phantom view in the fully unfolded position as supported by pontoons.

Side panels 116, 118 are connected to opposite side edges of underside 24 by piano hinges 120, 122 respectively. End panels 126 and 130 (FIG.8) are connected to ends of panels 116 and 118 by hinges 128 and 138 respectively. Recesses 132 and 134 are formed in walls 20 and 22 respectively, to form clearances for the truck bed rear wheel wells. Elongate panels 117 and 119 are connected to opposite side edges of underside 24 at recesses 132 and 134 respectively, by hinges 139 and 141, respectively. The purpose of end panels 126 and 130 is to provide clearance for struts 76 and 78 (FIG. 2).

In converting from the camper to the boat modes, struts 76 and 78 are placed in their respective housings 70 and 74, and adjusted so that wheels 84 and 86 are in ground contact. Camper body 10 may then be wheeled off bed 12 until clearance is made to insert and attach corresponding struts in housing 68 and 72. Once body 10 is clear of truck 14, panels 92, 104, 116, 117, 118 and 119 are folded downwardly until they are in horizontal position thus forming deck space around the periphery of underside 24 and contiguous thereto. Panels 94 and 96 are swung outwardly from panel 92; panels 108 and 110 are swung outwardly from panel 104. The body 10 is wheeled to the aquatic site, struts 76 and 78 and the remaining struts are removed and panels 126 and 130 are swung outwardly from the ends of panels 116 and 118, respectively. This completes a continous walking deck around body 10.

Assembly of pontoons sections 36, 38, 40 and 42 is now undertaken, after removal of the sections from the topside 26 of body 10. Sections 36 and 42 have tapered forward ends 110 and 112, respectively and are assembled at the forward end of the boat. Spacer arms 56 and 50 are returned to their original positions and bolts 64 and 68 are tightened. Likewise spacer arms 52 and 54 are returned to their original positions and bolts 60 and 62 are tightened. Sections 38 and 40 are placed rearwardly of and aligned with sections 36 and 42 respectively of underside 24 of body 10. Tubular steel cross beam 140 is placed between arms 50 and 56 forward at the fore end of the boat (FIGS. 7 and 8) and secured to pontoons 36 and 42 and panels 96 and 94 by threading bolts 142 and 144 into tapped holes 146 and 148 in pontoons 36 and 42 respectively (FIG. 7). In this manner panels 96 and 94 and pontoons 36 and 42 are rigidly held in fixed relation. The ends of cross beam 140 abut spacer arms 50 and 56.

In like manner, a cross beam 150 of tubular cross section and metallic material such as steel, is placed between spacer arms 52 and 54 aft of the boat and secured relative to pontoon sections 38 and 40 and deck panels 110 and 108, respectively by bolts 152 and 154 which are inserted through panels 110 and 108, respectively and threaded into tapped openings 156 and 158 in pontoon sections 38 and 40, respectively. Tubular cross beams 160, 162 and 164 (FIG. 8) span the entire width of the boat assembly, are square in cross section and made steel or other strong rigid material. Each cross beam 160, 162 and 164 is secured at its respective ends by bolts 170 which are inserted through holes in the corresponding deck panels, threaded into tapped receiving holes in the pontoon sections directly therebeneath. This provides an exceptionally sturdy, rigid, yet simple support to the deck panels, the pontoons, and the camper-boat body.

A plurality of sockets 180 are formed in panels 92, 94, 96, 116, 117, 118, 119, 104, 108 and 110 to receive bannisters 182, each of which has at the upper end thereof a hole for receiving railing cord 184 thereby providing an enclosed deck space and hand support for deck usage. In like manner, sockets 188 are formed in the top side 26 of a camper body to receive bannisters 190, each of which has at its upper end thereof an opening 192 to receive a railing cord 194 to provide an enclosure and hand support for top deck usage. There is no cord 194 above ladderwell 35.

The camper-boat is now ready for water use and may be provided with an outboard motor of conventional design attached in a conventional manner aft of the boat. The camper-boat may be converted for carriage on truck 14 by removing bannisters 180 and 190 and railing cords 184 and 194; removing bolts 170, 142, 144, 152, 154 cross beams 140, 150, 160, 162 and 164; moving pontoon sections, 36, 38, 40 and 42 to the top side of body 10 and strapping them in place; folding panels 92, 104, 116, 117, 118, 119 their associated end panels and the associated side panels of panels 92 and 104 in their retracted position against the respective sides and ends of camper body 10; inserting struts 76 and 78, the corresponding struts at the aft of the boat, in their respective housings and wheeling of body 10 to the bed 12 of pick-up truck 14. The aft struts may then be removed and the body 10 slid along the bed 12 and wheeled along the ground until struts 76 and 78 abut bed 12 at which time they are removed and body 10 is slid into final carrying position on bed 10.

Referring to FIGS. 10–12, a second preferred embodiment is shown wherein the front deck panels when folded against the camper-body provide access to the interior of the camper-body during terresterial travel. Camper-body 210 has spaced, parallel side walls 220 and 222, underside 224 and front wall 218. Door 230 having window 232 mounted therein is mounted by means of hinge 234 to wall 218. A front desk composed of sections 250 and 252, which are connected by hinge 254, is foldably pivoted by hinges 256, 258 to the lower edge of wall 218. Hinge 258 is composed of hinge portions 260 which are formed at the lower edge of wall 218 and mating hinge portions 262 which are formed at the rearward edge of section 252. In the fold-down panel position of FIG. 11, portions 262 and 260 are in mating registration and hinge pin 264 is inserted in the aligned hinge openings of portions 260 and 262 to hold section 252 in hinged relation to the lower edge of wall 218. Hinges 234, 254, 256 and 258 are "piano hinges" and, as mentioned previously, are of conventional construction and well known to the art. Section 252 is in horizontal registration with door 230 and provides a deck area immediately beneath the doorway.

Wing bolts 266 and 268 are inserted through openings 270 and 272, respectively, in section 250 and openings 274 and 276, respectively, in section 252 and are threadedly turned into tapped holes 280 and 282, respectively, in wall 218.

Pontoons 236 and 242 are shown in phantom in their respective positions for the embodiment of FIGS. 10–12. Crossbeams 278 and 280 are shown in position for the aquatic mode shown in FIG. 11 and are attached in supporting relation to sections 250 and 252 and pontoons 236 and 242 by bolts 251 in the manner bolts 170 are attached to pontoons 36 and 42.

When it is desired to convert between the aquatic mode shown in FIG. 11 to the terrestrial mode shown in FIG. 10, bolts 251 are removed, and cross beams 278 and 280 and pontoons 236 and 242 are disassembled. Sections 250 and 252 are then swung upwardly toward wall 218 after which hinge pin is removed. Section 252 is then swung or pivoted in a clockwise direction about hinge 254 disengaging hinge portions 260 and 262 until sections 252 is folded flat against section 250. Wing nuts 266 and 268 are then inserted through the openings in sections 250 and 252 and threaded respectively into holes 280 and 282 to hold the sections 250 and 252 in assembled relation for terrestrial travel. The remaining disassembly and storage takes place in a manner as described for the embodiment of FIGS. 1–9. By utilizing the construction of FIGS. 10–12, door 230 may be opened when the camper body is mounted on truck 14 to gain access to the interior thereof. Bannisters and railing cords may be provided as described for the embodiment of FIGS. 1–9.

Wall construction of body 10 and construction of the panels pivoted to the body are preferably that shown in FIG. 13. An expanded polystyrene center section 290, approximately 1½ inch thick, is bonded or otherwise adhered to a thin protective skin 292 and 294 on either side thereof. The skin material is preferably aluminum but may be any material that provides a suitable protective surface for the polystyrene center 290 when used as a body and deck section. When the embodiment is so constructed, there will be sufficient bouyancy to the camper body and panels to prevent the body from sinking even if the pontoons 236 and 242 become damaged and water filled. Preferably, the construction of pontoons 36, 42, 236 and 234 is hollow and the material is aluminum.

Section 92 and wing panels 94 and 96 may also be fastened to forward wall 18 by wing nuts 95 corresponding to nuts 266 and 268 to secure the deck panel and sections in place during terrestrial travel.

Further, sections 250 and 252 may be provided with wing panels in a manner similar to the provision and attachment of wing panels 94 and 96 to panel 92.

While there have been described above the principles of this invention in connection with specific apparatus, it is to be clearly understood that this description is made only by way of example and not as a limitation to the scope of the invention.

What is claimed is:

1. A convertible camper-boat for terrestrial and aquatic travel comprising:
    a camper-body having a fore end, an aft end, and two spaced generally parallel connecting said fore and aft ends,
    a plurality of flat panels; retracted position and in an extended position relative to said body, said panels in said retracted position being disposed adjacent to said body and in said extended position extending outwardly from and in supported relation to said body to form a deck space contiguous to said body;
    said panels including a panel being in attached and supported relation to each of said sides and a panel attached and supported in relation to at least one of said fore and aft ends;
    means for buoyantly supporting said body when said panels are in said extended position;
    each of said panels being quadrilateral and having two opposite edges connected by opposite ends, a first of said panels being attached and supported at one panel edge to said fore end, a second of said panels being attached and supported at one panel edge to said aft end, a third panel being attached and supported at one panel edge to a first side and a fourth panel being attached at one edge to a second side; and
    end panels retractably and extendably connected to each end of said first panel.

2. Apparatus according to claim 1 including end panels retractably and extendably connected to each end of said second panel.

3. Apparatus according to claim 2 including a plurality of rigid elongate cross beams, said cross beams being transverse to said pontoon members and longitudinally spaced along said pontoon members, said beams being removably attachable intermediate said panels and said pontoon members to provide rigid support to said panels and said pontoon members; and
    a first cross beam being attachable intermediately of the end panels of said first panel and said pontoon members and a second cross beam being attachable intermediately of the end panels of said second panel member and said pontoon members.

4. Apparatus according to claim 2 including end panels retractably and extendably connected to one end of each of said third and fourth panels.

5. Apparatus according to claim 4 wherein said first, second, third and fourth panels are hinged to said body, said panels in said retracted positions being folded against said body and in said extended positions being folded away from said body.

6. Apparatus according to claim 5 wherein said end panels of said first, second, third and fourth panels being hinged to their respective panel ends and in their retracted positions being folded against their respective panels and in their extended positions being folded away from and coplanar with their respective panels.

7. A convertible camper-boat for terrestrial and aquatic travel comprising:
a camper-body having a fore end, and aft end, and two spaced parallel sides connecting said fore and aft ends;
four flat panels;
each panel being quadrilateral and having two opposite edges connected by opposite ends, a first of said panels being attached and supported on one edge to said fore end, a second of said panels being attached and supported on one panel edge to said aft end, a third panel being attached on one edge to a first parallel side, a fourth panel being attached and supported on one panel edge to a second parallel side;
end panels retractably and extendably connected to one end of said third and fourth panels respectively;
two pair of elongated strut members, a first of said pairs being supported for vertical adjustment to and removable from one of said parallel sides, the second of said pairs being supported for vertical adjustment and removable from the second of said parallel sides, said strut members in said first pair being horizontally spaced along said one parallel side, said strut members in said second pair being horizontally spaced along said second parallel side, each of said strut members rotatably carrying a wheel member at the lower distal ends thereof, to provide wheeled support to said body in off-loading of said body from the land vehicle in terrestrial transport of said body to the aquatic site, said strut members being supported at opposite ends of said parallel sides so that clearance is provided for said members when said end panels of said third and fourth panels are in retracted position;
means for buoyantly supporting said body when said panels are in extended position.

8. A convertible camper-boat for terrestrial and aquatic travel comprising:
a camper-body having a fore end, an aft end, and two spaced generally parallel sides connecting said fore end and aft ends,
a plurality of flat panels;
means for attaching and supporting each of said panels in a retracted position and in extended position relative to said body, said panels in said retracted position being disposed adjacent to said body and in said extended position extending outwardly from and in supported relation to said body to form a deck space contiguous to said body;
said panels including a panel being in attached and supported relation to each of said sides and a panel attached and supported in relation to at least one of said fore and aft ends;
means for buoyantly supporting said body when said panels are in said extended position;
a door in hinged relation to one body end and swingable from a closed to an open position to provide a doorway to the body interior;
a panel having a first section and a second section retractably and extendably mounted to said one body end;
hinge means for foldably attaching said first section to a lower edge portion of said one body end; said lower edge portion being horizontally displaced from said doorway in order that said first section may be folded against said one end without obstructing said doorway;
said first section swingable away from said one end to a horizontal position to form a first deck area; said second section extendable from said first section to form a deck area contiguous to said first deck area and said one end and in horizontal registration with said doorway; and
said second section being retractable against said first section to provide access to said doorway when said first section is folded against said one end.

9. Apparatus according to claim 8 wherein said second section is attachable to said one end when in said extended position.

10. Apparatus according to claim 9 wherein said second section has hinge portions registrable with cooperating hinge portions on said one end; a hinge pin insertable in said hinge portions when said portions are in registration.

11. A convertible camper-boat for terrestrial and aquatic travel comprising:
a camper-body having a fore end, an aft end, and two spaced generally parallel sides connecting said fore and aft ends,
a plurality of flat panels;
means for attaching and supporting each of said panels in a retracted position and in an extended position relative to said body, said panels in said retracted position being disposed adjacent to said body in said extended position extending outwardly from and in supported relation to said body to form a deck space contiguous to said body;
said panels including a panel being in attached and supported relation to each of said sides and a panel attached and supported in relation to at least one of said fore and aft ends;
means for buoyantly supporting said body comprising at least two elongate pontoon members, one of said pontoon members being removably attachable to one of said side panels and a second of said pontoon members being removably attachable to the other of said side panels; and
a plurality of rigid elongate cross beams, said cross beams being transverse and attachable to said pontoon members and longitudinally spaced along said pontoon members, said beams being attachable to said panels to provide rigid support to said panels and said pontoon members.

12. A convertible camper-boat for terrestrial and aquatic travel comprising:
a camper-body having a fore end, an aft end, and two spaced generally parallel sides connecting said fore and aft ends,
a plurality of flat panels;
means for attaching and supporting each of said panels in a retracted position and in an extended position relative to said body, said panels in said retracted position being disposed adjacent to said body and in said extended position extending outwardly from and in supported relation to said body to form a deck space contiguous to said body;

said panels including a panel being in attached and supported relation to each of said sides and a panel attached and supported in relation to at least one of said fore and aft ends;

means for buoyantly supporting said body comprising at least two elongate pontoon members, one of said pontoon members being removably attachable to one of said side panels and a second of said pontoon members being removably attachable to the other of said side panels;

a plurality of rigid elongate cross beams, said cross beams being transverse and attachable to said pontoon members and longitudinally spaced along said pontoon members, said beams being attachable to said panels to provide rigid support to said panels and said pontoon members;

each of said panels being quadrilateral and having two opposite edges connected by opposite ends, a first of said panels being attached and supported at one panel edge to said fore end, a second of said panels being attached and supported at one panel edge to said aft end, a third panel being attached and supported at one panel edge to a first side and a fourth panel being attached at one edge to a second side;

a recess being formed in each of said parallel sides; a fifth elongate panel being attached to and supported to one of said sides at said one side recess and a sixth elongate panel being attached to and supported to the other of said sides at said other side recess; and said fifth and sixth panels are hinged to their respective sides; said fifth and sixth panels being folded into their respective recesses in said retracted positions and being folded away from their respective recesses in said extended positions.

* * * * *

UNITED STATES PATENT OFFICE
CERTIFICATE OF CORRECTION

Patent No. 4,024,592　　　　　　　　Dated May 24, 1977

Inventor(s)　　Philip B. Schlagenhauf

It is certified that error appears in the above-identified patent and that said Letters Patent are hereby corrected as shown below:

Col. 5, line 30,　　　　　"inserted" should be --insertable--.
Col. 5, line 47,　　　　　after "pin" insert --264--.

Claim 1, col. 6, line 25,　　after "parallel" insert --sides--.

Claim 1, col. 6, line 27,　　before "retracted" insert --means for attaching and supporting each of said panels in a--.

Claim 4, col. 6, line 68　　delete --of-- after "each".

Signed and Sealed this

Twenty-seventh Day of September 1977

[SEAL]

Attest:

RUTH C. MASON
Attesting Officer

LUTRELLE F. PARKER
Acting Commissioner of Patents and Trademarks